United States Patent

[11] 3,629,500

[72] Inventor Wouter Smeulers
Emmasingel, Eindhoven, Netherlands
[21] Appl. No. 876,398
[22] Filed Nov. 13, 1969
[45] Patented Dec. 21, 1971
[73] Assignee U.S. Philips Corporation
New York, N.Y.
[32] Priority Nov. 19, 1968
[33] Netherlands
[31] 6816515

[54] SYNCHRONIZING SIGNAL SEPARATOR WITH MEANS TO PREVENT DISCHARGE OF A THRESHOLD VOLTAGE CAPACITOR DURING NOISE PULSES
8 Claims, 2 Drawing Figs.

[52] U.S. Cl. .......... 178/7.3 S, 307/269, 328/139
[51] Int. Cl. .......... H04n 5/08
[50] Field of Search .......... 178/7.3 S, 7.5 S, 6 NS; 328/162, 165, 139; 307/269, 237

[56] References Cited

UNITED STATES PATENTS

| | | | |
|---|---|---|---|
| 2,880,271 | 3/1959 | Kroger .......... | 178/7.3 S |
| 3,109,061 | 10/1963 | Kramer .......... | 178/7.3 S |
| 3,256,502 | 6/1966 | Momberger .......... | 178/6 NS |
| 3,240,873 | 3/1966 | Hansen et al. .......... | 178/7.3 S |
| 3,441,669 | 4/1969 | Janson et al. .......... | 178/6 NS |

*Primary Examiner*—Robert L. Griffin
*Assistant Examiner*—Donald E. Stout
*Attorney*—Frank R. Trifari

ABSTRACT: A synchronization signal separator has an amplitude limiter which allows only synchronization signals to pass. A threshold capacitor determines the clip level of the amplitude limiter. An interference signal suppression circuit cuts off the amplitude limiter during noise pulses. To prevent discharge of the capacitor during noise pulses, the suppression circuit is coupled to the capacitor. Therefore, the separator will not become blocked during long duration noise signals.

Figure 1:
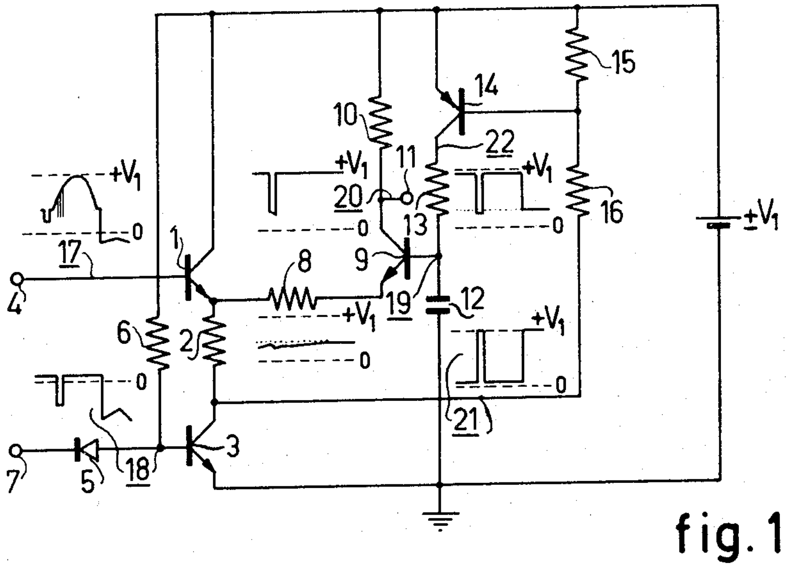

INVENTOR.
WOUTER SMEULERS

BY
Frank R. Trifari
AGENT

SYNCHRONIZING SIGNAL SEPARATOR WITH MEANS TO PREVENT DISCHARGE OF A THRESHOLD VOLTAGE CAPACITOR DURING NOISE PULSES

The invention relates to a synchronizing signal separator for separating a synchronizing signal from a video signal, which separator is provided with an amplitude limiter including a unidirectional current-conducting element which is connected to a direct voltage source, and a capacitor conveying a varying threshold voltage, and an associated leakage resistor, and which separator includes an interference signal compensation circuit formed with a switch connected in series with the unidirectional current-conducting element of the amplitude limiter, the switch being open under the influence of interference signals occurring in the video signal.

Such a synchronizing signal separator is known from German published Pat. application No. 1,181,737 in which a television receiver is mentioned as a field of application. The unidirectional current-conducting element in the amplitude limiter is formed as a PNP-transistor. A collector electrode of the transistor is connected through a resistor to a terminal conveying a negative potential of the direct voltage source. The video signal is applied with negatively directed line synchronizing pulses to a terminal of the said capacitor whose other terminal is connected to a base electrode of the transistor. The base electrode is connected through the leakage resistor to a terminal conveying a positive potential of the direct voltage source. The switch in the interference signal compensation circuit is formed as a PNP transistor whose collector electrode is connected to an emitter electrode of the transistor in the amplitude limiter and whose emitter electrode is connected to the positive terminal of the direct voltage source. A base electrode of the transistor active as a switch in the interference signal compensation circuit is connected to a tap on a resistive potential divider arranged between the terminals of the direct voltage source. The video signal is applied with positively directed line synchronizing pulses through a capacitor to the base electrode of the transistor active as a switch.

A bias voltage at which the transistor may be bottomed is impressed on the base electrode of the transistor in the interference signal compensation circuit with the aid of the resistive potential divider. The peaks of the negatively directed synchronizing pulses in the video signal which is applied to the transistor in the amplitude limiter are able to cause the transistor to be saturated. The capacitor in the amplitude limiter is then charged during the synchronizing pulses up to a voltage which corresponds to the peak value of the pulses. The threshold voltage across the capacitor caused thereby and decreasing owing to leakage through the leakage resistor results in the transistor in the amplitude limiter being cut off during the interval between two synchronizing pulses. The synchronizing pulses thus separated from the video signal may be derived from the collector electrode of the transistor.

An interference signal occurring in the video signal and having an amplitude which exceeds the peak value of the synchronizing pulses has the result that on the one hand the transistor in the interference signal compensation circuit is cut off, and on the other hand the transistor in the amplitude limiter would be saturated. The result is that the series-arranged transistors cannot convey current so that the interference signal cannot influence the threshold voltage across the capacitor.

The presence of interference signals at the instants of occurrence of the line synchronizing pulses in the video signal results in the normal saturated transistor in the amplitude limiter being unable to conduct current. Such an interference may last, for example, several line periods. As a result the charge across the capacitor flowing away through the leakage resistor will not be compensated for during these line periods by an equal supply. The result is that the threshold voltage across the capacitor varies. The disappearance of the interference gives the amplitude limiter the possibility of becoming active again. At the end of such a long interference, however, the threshold voltage across the capacitor may have varied to such an extent that the video information in the video signal during the interval between the synchronizing pulses causes the transistor in the amplitude limiter to be saturated. The result is that the synchronization of the television receiver is disturbed. This becomes manifest by twisting of more or less vertical lines on the display screen of the television receiver.

The interference described may be produced, for example, by switching on and using domestic electric appliances and commutator engines. For satisfactory operation of the television receiver the requirement may be imposed that the time constant of the capacitor and the leakage resistor in the amplitude limiter be small. A small time constant is desired in order that the synchronizing signal separator can follow possibly occurring interference phenomena on the carrier of the received television signal. In countries where strong reflections of television signals may occur due to, for example, mountains, the time constant in the amplitude limiter must be small for following the varying peak values of the synchronizing pulses in the video signal.

It is an object of the invention to provide a synchronizing signal separator which is provided with an amplitude limiter having a small time constant of the capacitor and the leakage resistor, while the interference insensitivity to long-lasting interferences is ensured. To this end the separator according to the invention is characterized in that a junction in the series arrangement of the unidirectional current-conducting element of the amplitude limiter and the switch of the interference signal compensation circuit is coupled to a tap on the leakage resistor formed as a potential divider in the amplitude limiter so that the said open switch impresses a voltage on the tapping which voltage minimizes the charge variation of the capacitor.

In order that the invention may be readily carried into effect, a few embodiments thereof will now be described in detail by way of example with reference to FIGS. 1 and 2 of the accompanying diagrammatic drawing.

FIG. 1 shows a synchronizing signal separator which may form part to a television receiver. Only that part of the receiver is shown which is essential for the explanation of the operation of the separator. The reference numeral 1 denotes an NPN-transistor an emitter electrode of which is connected through a resistor 2 to a collector electrode of an NPN-transistor 3 whose emitter electrode is connected to ground. A collector electrode of transistor 1 is connected to a terminal conveying a positive potential $+V_1$ of a direct voltage source $V_1$ another terminal of which is connected to ground. A base electrode of transistor 1 is connected to an input terminal 4 of the synchronizing signal separator. A base electrode of transistor 3 is connected to an anode of a diode 5 and is connected through a resistor 6 to the terminal of potential $+V_1$. The cathode of the diode 5 is connected to the input terminal 7 of the separator.

The emitter electrode of transistor 1 is connected to one end of a resistor 8 whose other end is connected to an emitter electrode of an NPN-transistor 9. A collector electrode of transistor 9 is connected through a resistor 10 to the terminal of potential $+V_1$ while the reference numeral 11 denotes an output terminal of the separator. A base electrode of transistor 9 is connected through a capacitor 12 to ground and to the terminal $+V_1$ through a series arrangement of a resistor 13 and a collector-emitter circuit of a PNP-transistor 14. The capacitor 12 may alternatively be connected in parallel with the series arrangement of the resistor 13 and the transistor 14. A base electrode of transistor 14 is connected to a resistive potential divider which is formed by a resistor 15 to the terminal of potential $+V_1$ and a resistor 16 to the collector electrode of the transistor 3.

The following components in the synchronizing signal separator according to the invention can be distinguished as regard their function: the transistor 1 in an emitter-follower arrangement; an amplitude limiter in which the transistor 9 is active as a unidirectional current-conducting element and which includes the capacitor 12 and the resistor 13; an interference signal compensation circuit (3,5,6) in which the saturated or cut-off transistor 3 is active as a closed or open switch; a circuit formed with the resistive potential divider including the resistors 15 and 16 and the transistor 3 active as a switch, and with the transistor 14 active more or less as a switch.

During operation a video signal shown as a function of time and denoted by the reference numeral 17 is applied to the input terminal 4 of the separator. The video signal 17 is shown for approximately one and a half line periods the broken lines showing the ground potential and the potential $+V_1$. As far as is necessary, the potentials 0 and $+V_1$ will also be shown in following signals. The signal 17 may be supplied, for example, by a video detector (not shown) in the television receiver. A received television signal is applied for example to the video detector which signal comprises a carried modulated in a negative sense by a video signal. The video signal 17 includes successively, going from left to right; a small part of one line period during which the video information is provided, a line synchronizing pulse, the video information of a second line period at which a short interference of high frequency is shown which does not exceed the pulse peaks of the synchronizing signal, and subsequently a long interference of low frequency commencing at the instant of a subsequent synchronizing pulse and which does exceed the pulse peaks. The interference of low frequency caused for example, by the use of electric appliances and engines and upon which an interference of high frequency (not shown) may be superimposed may last several line periods.

The interference occurring in the video signal 17 may be separated therefrom in known manner in the television receiver. This separation may be frequency-selective in which, for example, a strong 3 MHz component present in the interference of high frequency is determined. The separation may alternatively be effected amplitude-selectively if the maximum value of the interference exceeds the peaks of the synchronizing pulses in the video signal 17. The reference numeral 18 denotes a signal which provides the potential on the base electrode of the transistor 3. If no interference signal is applied to the input terminal 7, a potential is impressed through resistor 6 upon the base electrode of transistor 3 which potential exceeds the ground potential denoted by the reference 0; the transistor 3 is saturated. An interference signal denoted by a short pulse in the signal 18 and derived by frequency-selective separation from the interference of high frequency in the video signal 17 cuts off transistor 3. The same applies to the long interference signal obtained by amplitude-selective separation in signal 18. The many manners of obtaining the signal 18 are irrelevant to the invention.

To explain the operation of the separator, the starting point is the condition in which transistors 1, 3 and 14 are saturated and transistor 9 is cut off. This condition occurs, inter alia, for the extreme left part in the video-signal 17. The subsequent occurrence of a synchronizing pulse in the video signal 17 results in the voltage across resistor 2 becoming smaller than the threshold voltage across capacitor 12 so that transistor 9 is saturated. The reference numeral 19 denotes a signal which shows the potential variation at the terminal of capacitor 12 connected to the base electrode of transistor 9. The reference numeral 20 denotes a signal which shows the potential variation at the output terminal 11 of the separator. It is found that during a synchronizing pulse in the video signal 17 the capacitor 12 is slightly discharged (signal 19) while the separated synchronizing pulse (signal 20) occurs at the output terminal 11. The interference of high frequency subsequently occurring in the video signal 17 could cause the transistor 9 to be saturated, which is prevented by the transistor 3 being cut off under the influence of the interference signal 18. An obliquely rising line in signal 19 denotes that the capacitor 12 is charged during the interval between two synchronizing pulses. The slope of the line is then determined by the time constant of the capacitor 12 and the series arrangement of the resistor 13 and the much smaller resistance between collector and emitter electrodes of transistor 14. It is found that the voltage across capacitor 12 would continue to increase if there would not be temporary synchronizing pulses present to discharge the capacitor 12 periodically. When subsequently the interference-free video signal 17 becomes available again, the threshold voltage across capacitor 12 has become so high that transistor 9 is already saturated by the video information in the video signal 17 and remains saturated for a long period relative to the synchronizing pulse duration for the purpose of discharging capacitor 12.

To avoid the foregoing the transistor 14 and the resistors 15 and 16 are provided. The reference numeral 21 denotes a signal which shows the potential variation at the collector electrode of transistor 3 under the influence of the signal 18 applied to the base electrode. The positive going pulses in the signal 21, which are caused by cutting off the transistor 3, result in transistor 14 also being cut off. The potential variation occurring at the collector electrode of transistor 14 is denoted by a signal 22. Comparison of the signals 22 and 19, in which the same level is denoted by a dotted line, shows that it is achieved with the aid of the transistor 14 active as a switch that the voltage across capacitor 12 remains constant when an interference occurs.

The leakage resistor of capacitor 12, is formed, together with resistor 13 and transistor 14, as an adjustable potential divider between the terminal of potential $+V_1$ and the terminal of capacitor 12. If signal 18 does not include any interference signal the resistance value of transistor 14 is small relative to that of resistor 13. If an interference signal occurs, the transistors 3 and 14 act as synchronous switches switching at the same phase. The resistance value of transistor 14 then becomes infinitely great relative to that of the resistor 13.

The embodiment of the synchronizing signal separator shown in FIG. 1 operates in an ideal manner due to the switching off of the leakage resistors 13, 14. In the current integration techniques, in which the components of the separator are largely integrated in a semiconductor body, the problem occurs that NPN-transistors (1, 3, 9) can easily be integrated, but PNP-transistors (14) cannot. FIG. 2 shows a simple embodiment of a separator which can be integrated and in which only NPN-transistors are used. Signals and components shown in FIG. 2 and being equal to and switched in the same manner as those in FIG. 1 are denoted by the same reference numerals.

Figure 2:
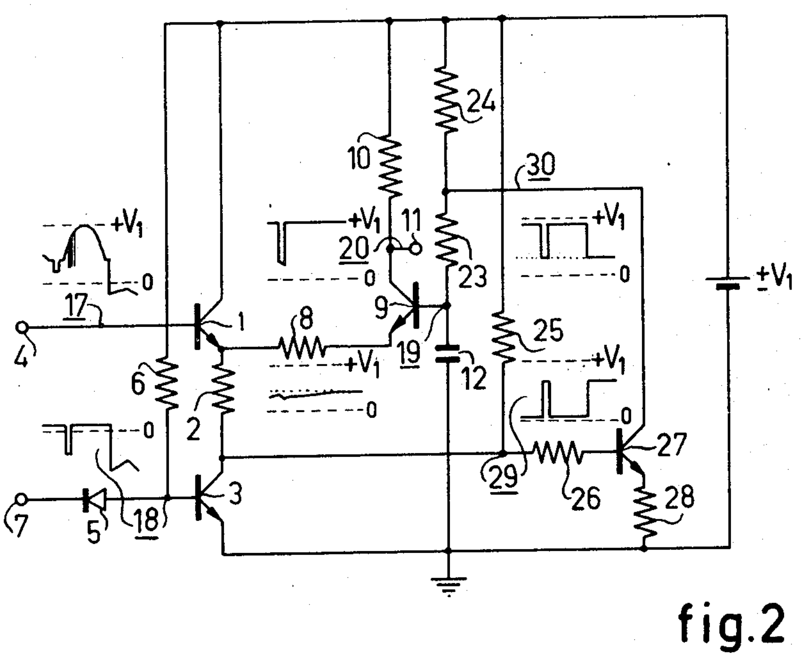

In FIG. 2 the terminal of capacitor 12 connected to the base electrode of transistor 9 is connected through a series arrangement of two resistors 23 and 24 to the terminal of potential $+V_1$. The collector electrode of transistor 3 is connected through a resistor 25 to the terminal of potential $+V_1$ and through a resistor 26 to a base electrode of an NPN-transistor 27. An emitter electrode of transistor 27 is connected to ground through a resistor 28, while a collector electrode is connected to the junction of resistors 23 and 24. The reference numeral 29 denotes a signal which shows the potential variation at the collector electrode of transistor 3. A signal 30 shows the potential variation at the junction of resistors 23 and 24.

If there is no interference, the voltage drop across the bottomed transistor 3 is lower than the base-emitter threshold of transistors 27 so that this transistor is cut off. The leakage resistance of the capacitor 12 is given by the resistor 23 and the resistor 24 of much smaller value. An interference signal in signal 18 cuts off the transistor 3 so that the potential on the collector electrode thereof increases. The transistor 27 will therefore be saturated. The potential on the junction of the resistors 23 and 24 decreases in signal 30 down to a value shown by a dotted line which is mainly determined by the voltage division across the resistors 24 and 28. The potential on the collector electrode of transistor 3 increases in signal 29 up to a value which is located between the potential $+V_1$ and the voltage across resistor 28 and which is determined by the voltage division across the resistors 25 and 26. It is essential to provide resistor 26, since it is ensured due to the voltage division across the resistive potential divider 25, 26 that the potential on the collector electrode of transistor 3 can increase to so high a value that the transistor 9 is certainly not saturated in case of an interference. It is found that the transistors 3 and 27 are active as synchronous switches switching in phase opposition.

A comparison of the signals 19 and 30, in the same level is shown by a dotted line, proves that the resistor 23 will convey a very small leakage current during the first short pulse in signal 30. During the second long pulse in signal 30 there will not flow any leakage current through resistor 23 due to the choice of the resistors 24 and 28. In the embodiment of FIG. 2 the values of the resistors 24 and 28 are therefore chosen to be such that the voltage division thereacross is associated with the nominal amplitude of the video signal 17. An increase or decrease of the amplitude of the video signal 17 relative to the nominal value will have the result in case of a cut-off transistor 3 that only little charge will flow away from capacitor 12 during the interference.

The synchronizing signal separator according to the invention is not limited to an embodiment employing active elements formed from semiconducting materials. The separator may be formed, for example, with an electron valve employing several control grids such as a hexode. A negatively directed interference signal is applied to a first control grid or cutting off the valve in case of interference occurring. A positively directed video signal is applied to a second control grid through a capacitor. The second control grid may be connected through a leakage resistor to a terminal of positive potential or to ground. If there are no interference signals present, the capacitor is charged during the synchronizing pulses in the video signal by grid rectification. The capacitor is discharged through the leakage resistor during the interval between the pulses. If an interference lasting several line periods occurs, so that the valve is cut off for a long period, the capacitor will be discharged. If the leakage resistor is connected to a terminal of positive potential, the capacitor can be charged in the opposite sense after discharging. It is found that the interfering effects already mentioned also occur in a valve circuit. To obviate this, the leakage resistor should be formed as a potential divider employing two resistors, so that a tap thereon can be coupled through, for example, an isolation capacitor to the first control grid. The negative going interference signal will vary the potential on the tap of the potential divider in a negative sense so that the discharge of the capacitor can greatly be decreased. The potential divider may of course alternatively be formed with a switch.

I claim:

1. A circuit for separating synchronization signals from video signals comprising an amplitude limiter including a unidirectional conducting means for receiving said video signals, and a capacitor means coupled to said conducting means for applying thereto a varying voltage that determines the threshold of conduction of said conducting means; a potential divider leakage means comprising an amplifier device having input, output and control electrodes coupled to said capacitor for discharging said capacitor during the occurrence of said synchronization signals and charging said capacitor between the occurrence of said synchronization signals, said leakage means, said input and output electrodes forming part of said leakage means a interference compensation means including a switch coupled in series with said unidirectional means whereby a junction is formed, said junction being coupled to said control electrode, said switch having a control terminal for receiving interference signals occurring in said video signal; whereby voltage variations of said capacitor during the occurrence of said interference signals are minimized.

2. A circuit as claimed in claim 1 wherein said amplifier device of said leakage means comprises a transistor having emitter, base and collector electrodes, said base being coupled to said junction; and a resistor coupled in series with the emitter-collector path of said transistor and said capacitor.

3. A circuit as claimed in claim 1 further comprising a potential divider coupled in series with said switch and having a tap coupled to said leakage means tap.

4. A circuit as claimed in claim 1 wherein said leakage means comprises two series coupled resistors, one of said resistors being coupled to said capacitor; a transistor having emitter, base, and collector electrodes, said collector being coupled to the junction of said resistors, said base being coupled to said switch; and an emitter resistor coupled to said emitter.

5. A circuit as claimed in claim 4 further comprising a base resistor coupled between said base and said switch and a biasing resistor coupled to the end of said base resistor that is coupled to said switch.

6. A circuit as claimed in claim 1 wherein said amplitude limiter further comprises an emitter follower circuit having an input for receiving said video signals and an output coupled to said unidirectional conducting means.

7. A circuit as claimed in claim 1 wherein said unidirectional conducting means comprises a transistor.

8. A circuit as claimed in claim 1 wherein said switch comprises a transistor.

* * * * *